Patented May 14, 1929.

1,712,716

UNITED STATES PATENT OFFICE.

GUSTAV REDDELIEN AND WERNER MUELLER, OF LEIPZIG, GERMANY, ASSIGNORS, BY MESNE ASSIGNMENTS, TO AGFA ANSCO CORPORATION, OF BINGHAMTON, NEW YORK, A CORPORATION OF NEW YORK.

N-HYDROXYETHYL DERIVATIVE OF AMINOHYDROXYBENZENES.

No Drawing. Application filed November 2, 1927, Serial No. 230,685, and in Germany November 19, 1926.

This invention relates to new N-hydroxyethylderivatives of aminohydroxybenzenes corresponding to the general formula

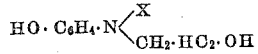

wherein X represents hydrogen or the group $\cdot CH_2 \cdot CH_2 \cdot OH$, and to the manufacture of these products.

The new bases are made by condensing a highly active derivative of ethane containing one atom of oxygen and containing in their molecule the atom figuration

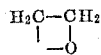

comprising halogen hydrin of glycol and ethylene oxide at ordinary or raised temperature with an aminohydroxybenzene; in some cases it is advantageous that an agent that binds acid should be present and there may also be used a diluent, a solvent or a catalyzer.

The following examples illustrate the manufacture of the new compounds the parts being by weight:—

*Example 1.*—110 parts of 4-amino-1-hydroxybenzene are mixed with 250 parts of ethylene chlorhydrin and 53 parts of anhydrous sodium carbonate and the mixture is heated in a reflux apparatus until it boils feebly. The reaction occurs quickly and after a few hours the product can be precipitated in thick brownish crystals by mixing the mass with cold saturated sodium carbonate solution. By recrystallization from boiling water and decolorizing by means of charcoal the colourless crystals of the 4-[di-(hydroxyethyl)]-amino-1-hydroxybenzene are obtained of melting point 140° C. The new base is soluble in water, acids and alkalies to a completely colourless solution. It is remarkably stable in dry condition and its solution also remains unchanged in air.

*Example 2.*—110 parts of 4-amino-1-hydroxybenzene are mixed with a solution of 60 parts of potassium hydroxide in 500 parts of alcohol and 81 parts of ethylene chlorhydrin in 100 parts of alcohol are added. Very soon potassium chloride begins to separate and the reaction can be quickly completed by heating. After separating the potassium chloride from the cold solution the product of the reaction may be precipitated in the form of sulphate from the solution by addition of 46–49 parts of concentrated sulphuric acid. By dissolving the sulphate in a little hot water and neutralizing with a solution of sodium carbonate of 10 per cent strength and cooling, a small quantity of unchanged 4-amino-1-hydroxybenzene can be recovered. Of the filtration the new base may be extracted from the filtrate by a suitable solvent from which it is obtained in the form of brownish crystals; when recrystallized from a mixture of ethylacetate and chloroform it forms colourless crystals of melting point 96–97° C. It is 4-(hydroxyethyl)-amino-1-hydroxybenzene. It is extraordinarily soluble in water, acids, alkalies, alcohol, ethylacetate and other solvents, but insoluble in benzene and benzine. Its sulphate contains half a molecular proportion of sulphuric acid and is soluble in much alcohol from which solution it may be obtained in the form of long slender prisms.

*Example 3.*—109 parts of 4-amino-1-hydroxybenzene suspended in 1000 parts of water are mixed with 5 parts of calcium carbonate. Whilst stirring slowly a stream of ethylene oxide is introduced until the 4-amino-1-hydroxybenzene is completely converted into the 4-[di-(hydroxyethyl)]-amino-1-hydroxybenzene.

The ethylene oxide in excess is removed by heating to the boiling point. The product of reaction dissolves and is filtered off from the residue. After cooling the 4-[di-(hydroxyethyl)]-amino-1-hydroxybenzene is separated in thick nearly colourless crystals. From the filtrate the remaining part of the product of reaction may be obtained by evaporation or by extraction with ethylacetate. By recrystallization from boiling water to which some sodium sulphite has been added the base is obtained as pure product.

*Example 4.*—In a suspension of 109 parts of 4-amino-1-hydroxybenzene in 1000 parts of a solution of sodium-hydroxide in water of 4 per mil. strength whilst stirring ethylene oxide is introduced at a temperature of 70° C. The 4-[di-(hydroxyethyl)]-amino-1-hydroxybenzene thus obtained is purified in the manner described in Example 3.

*Example 5.*—109 parts of 4-amino-1-hydroxybenzene, 1000 parts of water, 5 parts of concentrated sulphuric acid and 1 part of mercuric acetate are mixed and heated to 60–70° C. Whilst stirring a strong stream of ethylene oxide is introduced. After a short time the 4-(hydroxyethyl)amino-1-hydroxybenzene has been formed. The introduction of ethylene oxide is stopped if 4-[di-(hydroxyethyl)]-amino-1-hydroxybenzene begins to be formed. After heating to the boiling point the solution is neutralized with sodium carbonate, filtered and cooled. After three hours the unchanged 4-amino-1-hydroxybenzene and some 4-[di-(hydroxyethyl)]-amino-1-hydroxybenzene are separated by filtration, the filtrate is evaporated in vacuo to dryness and the organic residue is dissolved in 400 parts of alcohol. To the alcoholic solution slowly 20-25 parts of concentrated sulphuric acid are added at a temperature of 15-25° C. The 4-(hydroxyethyl)amino-1-hydroxybenzene separates as sulphate in the form of thick brownish crystals. It may be recrystallized from alcohol of 80-90 per cent strength and is identical with the product described in Example 2.

*Example 6.*—In a suspension of 109 parts of 4-amino-1-hydroxybenzene in 1500 parts of water a stream of ethylene oxide is introduced at a temperature of 70° C. until the 4-amino-1-hydroxybenzene is no more to be found in the reaction vessel. The aqueous solution of the product of reaction, a mixture of 4-[di-(hydroxyethyl)]-amino-1-hydroxybenzene and 4-(hydroxyethyl)-amino-1-hydroxybenzene, is heated to the boiling point, filtered and cooled. The greater part of 4-[di-(hydroxyethyl)]-amino-1-hydroxybenzene is separated in the form of thick nearly colourless crystals which are separated from the aqueous solution containing the 4-(hydroxyethyl)amino-1-hydroxybenzene. It is finished in the usual manner.

*Example 7.*—109 parts of 2-amino-1-hydroxybenzene are heated with 130 parts of calcium carbonate, 2000 parts of water and 162 parts of ethylene chlorhydrin slowly to the boiling point and boiled in a reflux apparatus until the ethylene chlorhydrin has disappeared. After 2 to 3 hours 110 parts of sodium carbonate are added to the hot mixture. Calcium carbonate is separated and filtered off from the hot solution. After cooling the 2-[di-(hydroxyethyl)]-amino-1-hydroxybenzene is extracted from the solution by means of ethylacetate. It is in the unpurified state a brownish oil; its purified sodium salt, made by addition of sodium hydroxide forms colourless laminated crystals which are decomposed at a temperature above 240° C. They are easily soluble in water, alkalies and acids.

*Example 8.*—109 parts of 2-amino-1-hydroxybenzene are mixed with 60 parts of calcium carbonate and 1000 parts of boiling water, 81 parts of ethylene chlorhydrin being added. After boiling for some hours, 55 parts of sodium carbonate and then 500 parts of boiling water are added. The separated calcium carbonate is filtered off. From the yellowish brown filtrate after cooling the 2-(hydroxyethyl)-amino-1-hydroxybenzene and some 2-[di-(hydroxyethyl)]-amino-1-hydroxybenzene are extracted with ethylacetate. The recrystallized 2-(hydroxyethyl)amino-1-hydroxybenzene forms laminated crystals of melting point 80-81° C. The base is easily soluble in water, acids and alkalies, alcohol, ethylacetate, acetone and difficultly soluble in chloroform, benzene. Its sulphate recrystallized from dilute alcohol forms small slender prisms, easily soluble in water.

*Example 9.*—In a suspension of 109 parts of 2-amino-1-hydroxybenzene in 1500 parts of water after addition from 5 parts of calcium carbonate a stream of ethylene oxide is introduced whilst stirring at a temperature of 60-70° C. until the 2-amino-1-hydroxybenzene is completely converted into the 2-[di-(hydroxyethyl)]-amino-1-hydroxybenzene. After boiling and filtration 100 parts of a solution of sodium hydroxide of 36° Bé. strength is added. The sodium compound of the product of reaction is separated in form of nearly colourless laminated crystals. A saturated solution of sodium chloride is added and after cooling the crystals are separated by filtration. The recrystallized product is identical with that described in Example 7.

*Example 10.*—160 parts of 2-amino-1-hydroxybenzene-sulphate are heated with 1000 parts of water to 70° C. Whilst stirring a stream of ethylene oxide is introduced which is stopped if 2-[di-(hydroxyethyl)]-amino-1-hydroxybenzene begins to be formed. The solution is heated to the boiling point, neutralized with sodium carbonate and filtered. After cooling the clear solution is extracted with ethylacetate. The 2-(hydroxyethyl)amino-1-hydrobenzene obtained from the extract in the usual manner is identical with that described in Example 8.

A loss of ethylene oxide applied in Examples 3, 4, 5, 6, 9 and 10, is avoided by employing a battery of reacting vessels following one the other.

What we claim is:—

1. The new N-hydroxyethylderivatives of aminohydroxybenzenes corresponding to the general formula

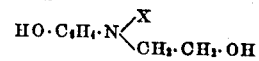

wherein X represents hydrogen or the group ·CH₂·CH₂·OH being colourless products soluble in water, acids and alkalies to colourless solutions, being stable when exposed to air, their solutions also remaining unchanged in air.

2. The new N-hydroxyethylderivatives of aminohydroxybenzenes corresponding to the general formula

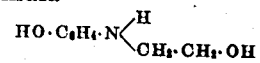

forming in the dry state colourless crystals, easily soluble in water, acids, alkalies, alcohol, acetone, ethylacetate, forming with sulphuric acid a colourless salt which recrystallized from alcohol forms colourless prisms easily soluble in water.

3. The new N-hydroxyethylderivatives of 4-amino-1-hydroxybenzene corresponding to the general formula

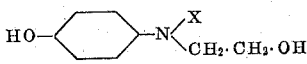

wherein X represents hydrogen or the group ·CH$_2$·CH$_2$·OH being colourless crystallized products soluble in water, acids and alkalies to colourless solutions, being stable in dry condition, their solutions also remaining unchanged in air.

4. The new N-hydroxyethylderivative of 4-amino-1-hydroxybenzene corresponding to the formula

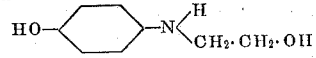

forming colourless crystals of melting point 96–97° C., easily soluble in water, acids, alkalies, alcohol, ethylacetate, difficulty soluble in benzene, benzine, forming with sulphuric acid a salt which contains half a molecular proportion of sulphuric acid and which is soluble in much alcohol from which solution it may be obtained in the form of long slender prisms.

5. A manufacture of N-hydroxyethylderivatives of aminohydroxybenzenes by condensing aminohydroxybenzenes with a highly active derivative of ethane containing one atom of oxygen and containing in their molecule the atom figuration

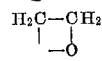

comprising halogen hydrin of glycol and ethylene oxide.

6. A manufacture of N-hydroxyethylderivatives of aminohydroxybenzenes by condensing aminohydroxybenzenes with a highly active derivative of ethane containing one atom of oxygen and containing in their molecule the atom figuration

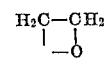

comprising halogen hydrin of glycol and ethylene oxide in the presence of an agent that binds acid.

7. A manufacture of N-hydroxyethylderivatives of aminohydroxybenzenes by condensing aminohydroxybenzenes with chlorhydrin of glycol.

8. A manufacture of N-hydroxyethylderivatives of aminohydroxybenzenes by condensing aminohydroxybenzenes with chlorhydrin of glycol in the presence of an agent that binds acid.

9. A manufacture of N-hydroxyethylderivatives of 4-amino-1-hydroxybenzene by condensing 4-amino-1-hydroxybenzene with a highly active derivative of ethane containing one atom of oxygen and containing in their molecule the atom figuration

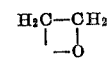

comprising halogen hydrin of glycol and ethylene oxide.

10. A manufacture of N-hydroxyethylderivatives of 4-amino-1-hydroxybenzene by condensing 4-amino-1-hydroxybenzene with a highly active derivative of ethane containing one atom of oxygen and containing in their molecule the atom figuration

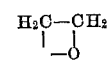

comprising halogen hydrin of glycol and ethylene oxide in the presence of an agent that binds acid.

11. A manufacture of N-hydroxyethylderivatives of 4-amino-1-hydroxybenzene by condensing 4-amino-1-hydroxybenzene with chlorhydrin of glycol.

12. A manufacture of N-hydroxyethylderivatives of 4-omino-1-hydroxybenzene by condensing 4-amino-1-hydroxybenzene with chlorhydrin of glycol in the presence of an agent that binds acid.

13. The manufacture of 4-(hydroxyethyl)-amino-1-hydroxybenzene by condensing molecular proportions of 4-amino-1-hydroxybenzene and chlorhydrin of glycol.

In testimony whereof, we affix our signatures.

GUSTAV REDDELIEN.
WERNER MUELLER.

Certificate of Correction.

Patent No. 1,712,716.            Granted May 14, 1929, to

GUSTAV REDDELIEN ET AL.

It is hereby certified that error appears in the printed specification of the above numbered patent requiring correction as follows:

Page 1, line 5, for the formula $$HO \cdot C_6H_4 \cdot N\begin{array}{c}X\\CH_2 \cdot HC_2 \cdot OH\end{array} \quad \text{read} \quad HO \cdot C_6H_4 \cdot N\begin{array}{c}X\\CH_2 \cdot CH_2 \cdot OH\end{array};$$

page 3, line 91, claim 12, for "4-omino-1-hydroxybenzene" read *4-amino-1-hydroxybenzene;* and that the said Letters Patent should be read with these corrections therein that the same may conform to the record of the case in the Patent Office.

Signed and sealed this 25th day of June, A. D. 1929.

[SEAL]                          M. J. MOORE,
*Acting Commissioner of Patents.*